United States Patent [19]

Berthold et al.

[11] Patent Number: 5,399,185
[45] Date of Patent: Mar. 21, 1995

[54] PROCESS FOR PRODUCING A PHOSPHOR LAYER BY REACTING A DOPED SUBSTANCE WITH SILICA

[75] Inventors: Thomas Berthold, Munich; Christa Grabmaier, Berg, both of Germany

[73] Assignee: Siemens Aktiengesellschaft, Munich, Germany

[21] Appl. No.: 167,864

[22] PCT Filed: Jun. 29, 1992

[86] PCT No.: PCT/DE92/00534

§ 371 Date: Dec. 15, 1993

§ 102(e) Date: Dec. 15, 1993

[87] PCT Pub. No.: WO93/02982

PCT Pub. Date: Feb. 18, 1993

[30] Foreign Application Priority Data

Jul. 30, 1991 [DE] Germany .................. 41 25 200.4

[51] Int. Cl.⁶ .............................................. C03C 17/00
[52] U.S. Cl. .................................. 65/430; 427/157; 427/399; 65/60.1; 65/60.8; 65/60.5
[58] Field of Search ............... 427/157, 399; 65/430, 65/60.1, 60.4, 60.5, 60.53, 60.8

[56] References Cited

U.S. PATENT DOCUMENTS 2,219,895 10/1940 Hanlein .
2,408,475 10/1948 Nichke .
2,689,188 9/1954 Hushley ........................... 65/60.8
3,279,903 10/1966 Siegmund ......................... 65/60.8
3,291,706 12/1966 Gebel ............................... 427/157
5,302,423 4/1994 Tran ................................. 427/157

FOREIGN PATENT DOCUMENTS 572719 3/1959 Canada ............................. 427/399
1113101 3/1965 United Kingdom .
1225434 3/1971 United Kingdom .

OTHER PUBLICATIONS

Reisman et al. "Process for Adhering CdSe Layers to Silica Substrates", Dec. 1961, IBM Technical disclosure Bull.

Mat. Research Bull. vol. 24, pp. 175–179, Feb. 1989, Morimo et al., Preparation of $Zn_2SiO_4$–Mn Phosphors.

Primary Examiner—W. Gary Jones
Assistant Examiner—John Hoffmann
Attorney, Agent, or Firm—Hill, Steadman & Simpson

[57] ABSTRACT

A doped starting substance is applied to a substrate composed of $SiO_2$ glass. A phosphor layer is formed by reaction of the starting substance with $SiO_2$ of the substrate to form a silicate of the starting substance. This reaction is carried out in a heat-treatment process in an oxygen-containing atmosphere. Zn or Gd is preferably used as starting substance.

11 Claims, 1 Drawing Sheet

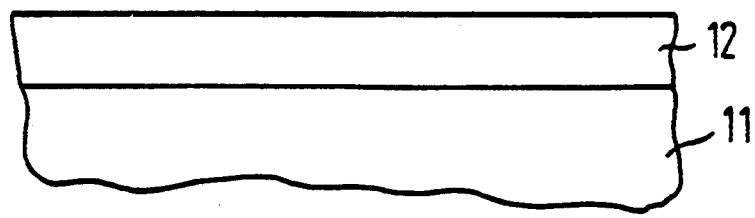
FIG 1
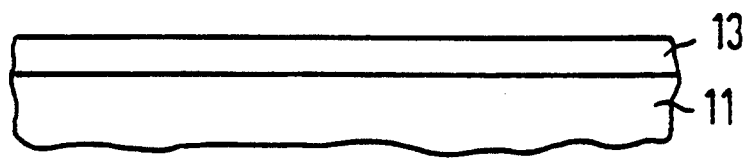
FIG 2
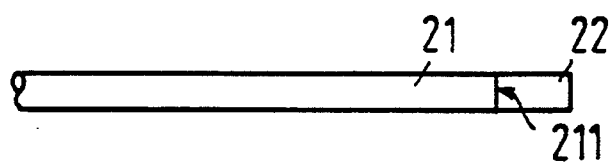
FIG 3
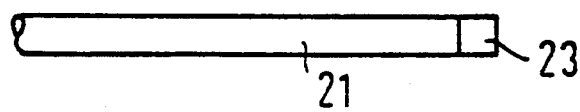
FIG 4
FIG 5
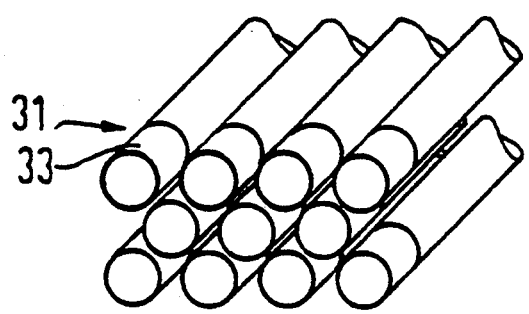

PROCESS FOR PRODUCING A PHOSPHOR LAYER BY REACTING A DOPED SUBSTANCE WITH SILICA

BACKGROUND OF THE INVENTION

1. Field of the Invention

The present invention is directed to a process for producing a phosphor layer on a substrate, suitable for producing a scintillator.

X-ray radiation can be converted into visible light with the aid of scintillators. This visible light can then be registered by photodetectors. Such scintillators are used, for example, for producing medical radiographs.

2. Description of the Prior Art

A phosphor layer which is disposed on a glass substrate is often used as a scintillator. In addition to a good light yield and a narrowly defined particle size and layer thickness of the phosphor layer, a good adhesion of the phosphor layer to the substrate is also important.

To measure the intensity distribution of a wide X-ray beam, for example for producing medical radiographs, a positional resolution is necessary in the plane of the intensity distribution to be measured. For this purpose, small scintillators which are disposed alongside one another are generally used. In the direction of the radiation propagation of the X-ray radiation, said scintillators have to be so thick that they protect the photodetectors against radiation damage by absorbing the X-ray radiation.

It is known to produce phosphor layers on a substrate by vapor deposition, screen printing or sedimentation of phosphors. The technical complexity and the susceptibility to defects of this process is generally high. A good adhesion of the phosphor layer to the substrate can only be achieved if the substrate is carefully cleaned. The phosphor is applied as powder. The powder already has the chemical composition necessary for the phosphor layer. This powder has to be produced beforehand in a process which is usually complex. In order to achieve a uniform layer thickness of the phosphor, the substrate must if possible have no profile (i.e., the substrate must be as smooth as possible).

It is known to produce scintillators in the form of layers composed of crystal needles disposed perpendicularly to the layer. The crystal needles comprise, for example, CsI:Na. In this case, the needles must have large enough dimensions in the direction of the incident X-ray radiation for the X-ray light to be largely absorbed. The positional resolution is determined by the diameter of the needles perpendicular to the direction of incidence of the X-ray radiation. In these scintillators, most of the X-ray light is converted into luminescent light in the first third of the scintillator crystal. In the rest of the crystal, the still unabsorbed radiation is attenuated to such an extent that the photodetectors are protected against radiation damage. The layers produced must therefore be disproportionately thick, compared with their light yield.

SUMMARY OF THE INVENTION

The invention is directed to the problem of providing a process for producing phosphor layers, with which process uniform phosphor layers can be produced even on uneven substrates or arbitrarily structured substrates. The process is intended to make it possible to produce phosphor layers either for large-area detectors or for scintillators having a high positional resolution.

According to the invention, the problem is solved in a process wherein a layer composed of a doped starting substance is applied to a $SiO_2$ glass substrate, and wherein the phosphor layer is produced by reacting the starting substance with the $SiO_2$ of the substrate to form a silicate of the starting substance in a heat-treatment process conducted at a reaction temperature in an oxygen-containing atmosphere, the $SiO_2$ glass substrate having a softening point which is above the reaction temperature. The phosphor layer is produced by reaction of a starting substance, which is applied as a layer to a substrate composed of $SiO_2$ glass, with the $SiO_2$ from the substrate surface. It therefore has very good adhesion to the surface of the substrate. Furthermore, the phosphor layer is produced in a uniform thickness.

In the process according to the invention, for example, phosphor layers can be produced from zinc silicate, bismuth silicate or silicates of the rare earths. In this connection zinc silicate and gadolinium silicate are particularly important for industrial applications.

The starting substance is applied, together with dopants, as a layer to the substrate composed of $SiO_2$ glass. The layer can be produced by vapor deposition, spraying, screen printing or slip casting. The best results in relation to uniformity of the layer are achieved by vapor deposition.

An $SiO_2$ glass whose softening point is above the reaction temperature must be used as substrate. In particular, quartz glass is particularly suitable for this purpose.

It is within the scope of the invention that the layer composed of the doped starting substance contains an oxide of the starting substance.

If the process is carried out with zinc (Zn) as starting substance, the heat-treatment process is carried out at at least 900° C. In that case it is advantageous to carry out the reaction at 1,200° C. in order to achieve a higher reaction rate. In the case of the starting substance Zn, for example Bi or Mn is used as dopant.

In carrying out the process with the starting substance gadolinium (Gd), the heat-treatment process is carried out at at least 900° C. Good results are achieved at 1,200° C. A suitable dopant in this case is a rare-earth element, in particular Pr or Tb, or an oxide of the rare earths.

In order to avoid cracks in the substrate, it is advantageous to cool the phosphor layer in a controlled manner after the heat-treatment process. In this process, the temperature range between 500° C. and 200° C. is traversed at less than 100° C. per hour. This measure is particularly important in the case of large-area substrates.

To produce large-area scintillators, the phosphor layer is applied to $SiO_2$ glass plates of suitable size.

It is within the scope of the invention to use optical waveguide fibers composed of $SiO_2$ glass as substrate. These can be treated individually or in a fiber bundle. Under these circumstances the layer composed of the doped starting substance is applied in each case to an end face of an optical waveguide fiber. Because of the geometrical size, it is beneficial in this case to apply the starting substance by vapor deposition. That end of the optical waveguide fiber which is provided with the layer is converted into a scintillation element by reaction of the starting substances with the $SiO_2$ in an oxygen atmosphere. The positional resolution of the scintillation element is determined by the diameter of the optical waveguide fiber. A scintillation counter which is made up of a multiplicity of optical waveguide fibers disposed alongside one another and having phosphor layers produced by the process according to the invention therefore has a very uniform positional resolution. This can be adjusted in a technically simple and reliable manner by means of the diameter of the optical waveguide fibers used.

The X-ray radiation is converted into luminescent light in the phosphor layer. The residual X-ray radiation not converted into luminescent light is absorbed in the adjoining optical waveguide fiber. In this embodiment, the thickness of the phosphor layer is optimized in such a way that luminescent light is produced in it in an amount sufficient for the detection. The length of the optical waveguide fiber is chosen in such a way that the residual X-ray radiation is essentially absorbed prior to entering a photodetector disposed downstream of the optical waveguide. In contrast to the conventional technology, the photodetectors do not have to be disposed immediately downstream of the scintillator elements.

As a result of using monomode optical waveguide fibers, it is possible to remove light components having a wavelength other than the useful light from the glass fiber. In this way, luminescence waves having unduly long decay time can be suppressed if they differ in their wavelength sufficiently from the luminescent light with short decay time.

DESCRIPTION OF THE DRAWINGS

The invention is explained in greater detail below by reference to exemplary embodiments and to the figures.

FIGS. 1 and 2 show the production of a phosphor layer on a glass plate.

FIGS. 3 and 4 show the production of a phosphor layer on the end face of an optical waveguide fiber.

FIG. 5 shows an optical waveguide fiber bundle.

DESCRIPTION OF THE PREFERRED EMBODIMENTS

A layer 12 of a doped starting substance is applied to a substrate 11 (see FIG. 1). The substrate 11 is a glass plate composed of $SiO_2$ glass.

The layer 12 of the doped starting substance comprises, for example, zinc doped with Mn or Bi.

The substrate 11 with the layer 12 is then heat-treated for about 3 hours at at least 900° C. in an oxidizing atmosphere. In this process, the substrate 11 must comprise a type of $SiO_2$ glass which is such that its softening point is above the reaction temperature of the heat treatment. In this reaction, ZnO is first formed from Zn and then $Zn_2SiO_4$ is formed by reaction with the $SiO_2$ of the substrate 11. Either pure oxygen or air is suitable as oxidizing atmosphere. As a result, a phosphor layer 13 composed of $Zn_2SiO_4$ is formed on the substrate (see FIG. 2). The phosphor layer 13 is fine-grained and firmly adheres to the substrate. When irradiated with electrons, UV light or X-ray-radiation, it radiates light very intensively if it has been suitably doped with Mn or Bi. In this connection, a dopant concentration in the region of 0.1–5 mol % is recommended.

The layer 12 may also be vapor-deposited, for example, from doped ZnO. The phosphor layer 13 composed of $Zn_2SiO_4$ is then produced by subsequent heat treatment above 900° C. in an oxygen atmosphere, i.e. in pure oxygen or air.

In a third exemplary embodiment, the layer 2 composed of doped gadolinium is applied. Gadolinium is oxidized to gadolinium oxide by heat treatment above 900° C. in an oxygen atmosphere, i.e. in pure oxygen or in air. The gadolinium reacts with $SiO_2$ of the substrate 11 to form the gadolinium silicate of the phosphor layer 13.

In a fourth exemplary embodiment, the layer 12 is formed by vapor deposition of gadolinium oxide. The gadolinium oxide reacts with $SiO_2$ of the substrate 11 to form gadolinium silicate, which forms the phosphor layer 13, by heat treatment, as described in the third exemplary embodiment.

To avoid stresses in the substrate 11, it is advantageous in all four exemplary embodiments to traverse the temperature range between 500° C. and 200° C. at than 100° per hour during cooling.

In a further exemplary embodiment, an optical waveguide fiber composed of $SiO_2$ glass is used as substrate 21 (see FIG. 3). A layer 22 of a doped starting substance is applied to the substrate 21. The layer 22 is applied to an end face 211 of the optical waveguide fiber. The layer 22 is formed, for example, by vapor deposition of zinc (Zn) doped with manganese (Mn).

In an oxygen atmosphere, i.e. in pure oxygen or in air, the starting substance of the layer 22 reacts with the $SiO_2$ of the substrate 21 at 1,200° C. to form $Zn_2SiO_4$. As a result, a phosphor layer 23 is formed at the end of the optical waveguide fiber to which the layer 22 was applied. The corresponding end of the optical waveguide fiber is consequently converted into the phosphor layer 23, which is a scintillation element. The phosphor layer 23 is firmly joined to the optical waveguide fiber.

As described by reference to FIGS. 1 and 2, a layer composed of zinc oxide, gadolinium or gadolinium oxide can also be used here as layer 22.

In the exemplary embodiment described by reference to FIGS. 3 and 4, an optical waveguide fiber bundle 31 can also be used as substrate 21 instead of an individual optical waveguide fiber (see FIG. 5). In this case, a layer of a doped starting substance, for example zinc, is applied to an end face of each optical waveguide fiber in the bundle. A phosphor layer 33 composed of $Zn_2SiO_4$ is formed by reaction between the zinc and the $SiO_2$ of the optical waveguide fibers at 1,200° C. in an oxygen atmosphere. In this case, a multiplicity of scintillation elements is produced simultaneously in each case at one end of an optical waveguide fiber. The arrangement of the scintillator elements with respect to one another corresponds to the arrangement of the optical waveguide fibers. The positional resolution which can be achieved with these scintillator elements is determined by the diameter of the optical waveguide fiber used.

The thickness of the phosphor layer produced depends in each case on the application of the scintillation element produced. For application in X-ray image intensifiers, layer thicknesses of $Zn_2SiO_4$ of, for example, 3 μm are used. For this purpose, the layer of the doped starting substance Zn is vapor-deposited in a thickness of, for example 5 to 6 μm in the production process according to the invention.

We claim as our invention:

1. A process for producing a phosphor layer on a substrate comprising the steps of:
   applying a first layer composed of a starting substance doped with a dopant on a $SiO_2$ glass substrate; and
   producing a phosphor layer by reaction of said starting substance with the $SiO_2$ of the substrate to form a silicate of said starting substance by heat treatment at a reaction temperature in an oxygen-containing atmosphere, said SiO$_2$ glass substrate having a softening point above said reaction temperature.

2. A process as claimed in claim 1 wherein said first layer is applied by vapor deposition.

3. A process as claimed in claim 1, wherein said dopant is an oxide of said starting material.

4. A process as claimed in claim 1 wherein said first layer is selected from the group consisting of zinc and zinc oxide and wherein the step of producing said phosphor layer is further defined by conducting said heat treatment at a temperature of at least 900° C.

5. A process as claimed in claim 4 wherein said dopant comprises at least one dopant selected from the group consisting of bismuth and manganese.

6. A process as claimed in claim 1 wherein the doped starting substance is selected from the group consisting of Gd and Gd$_2$O$_3$ and wherein the step of producing said phosphor layer is further defined by conducting said heat treatment at a temperature of at least 900° C.

7. A process as claimed in claim 6 wherein the dopant is selected from the group consisting of rare earths and oxides of rare earths.

8. A process as claimed in claim 1 comprising the additional step of:
    cooling said phosphor layer in a controlled manner after said heat treatment including cooling through a temperature range from 500° C. to 200° C. at less than 100° C. per hour.

9. A process as claimed in claim 1 wherein the substrate is a SiO$_2$ glass plate.

10. A process as claimed in claim 1 wherein the substrates an end face of at least one optical waveguide fiber composed of SiO$_2$ glass as a substrate.

11. A process as claimed in claim 10 wherein the at least one optical fiber is a monomodal optical fiber.

* * * * *